United States Patent [19]

Nishino

[11] Patent Number: 4,939,669

[45] Date of Patent: Jul. 3, 1990

[54] PRINT CONTROL SYSTEM CAPABLE OF EFFECTIVELY ALLOCATING A VARIABLE LENGTH DATA SEQUENCE TO A PRINT ZONE

[75] Inventor: Rikio Nishino, Tokyo, Japan

[73] Assignee: NEC Corporation, Tokyo, Japan

[21] Appl. No.: 39,128

[22] Filed: Apr. 16, 1987

[30] Foreign Application Priority Data

Apr. 18, 1986 [JP] Japan ................................. 61-90893

[51] Int. Cl.⁵ .......................................... G06F 15/419
[52] U.S. Cl. ..................................... 364/519; 400/76; 400/279
[58] Field of Search ........ 364/519, 518, 900 MS File; 400/61, 62, 64, 68, 76, 279

[56] References Cited

U.S. PATENT DOCUMENTS

| | | | |
|---|---|---|---|
| 4,258,361 | 3/1981 | Hydes et al. | 340/721 |
| 4,470,129 | 9/1984 | Disbrow et al. | 364/900 |
| 4,503,515 | 3/1985 | Cuan et al. | 400/76 X |
| 4,564,302 | 1/1986 | Hatazawa | 400/76 |
| 4,651,288 | 3/1987 | Zeising | 400/62 X |
| 4,778,288 | 10/1988 | Nakamura | 400/61 X |

Primary Examiner—Gary V. Harkcom
Assistant Examiner—Mark K. Zimmerman
Attorney, Agent, or Firm—Foley & Lardner, Schwartz, Jeffery, Schwaab, Mack, Blumenthal & Evans

[57] ABSTRACT

In a print control system for use in printing a sequence of variable length data to form a report having a plurality of partial print areas, the variable length data sequence is divided into a plurality of partial data sections which are related to the partial print areas and which might leave blank partial print areas on the report due to shortness of the variable length data sequence. Physical or actual allocation of the variable length data to blank partial print areas is suppressed by an allocation section under control of an allocation control section when suppression of the allocation is indicated by a program controller. The allocation control section becomes active to send an allocation control signal to the allocation section only when the suppression of allocation signal is received. Such suppression may be described in a nonprocedural language.

8 Claims, 7 Drawing Sheets

(r+1) $m_r : n_r - m_r : n_{r0}>$ (r+2) [TRUNCATE]

PRINT CONTROL SYSTEM CAPABLE OF EFFECTIVELY ALLOCATING A VARIABLE LENGTH DATA SEQUENCE TO A PRINT ZONE

BACKGROUND OF THE INVENTION

This invention relates to a print control system for use in printing a sequence of variable length data on a report having a plurality of partial print areas specified by rows and columns.

In a conventional print control system of the type described, a variable length data sequence is divided into a plurality of unit sequences which are assigned to a plurality of rows to form a report. The variable length data sequence may include blank data indicative of blanks. Thereafter, each unit sequence is successively printed by a printer row by row. With this structure, it is difficult to allocate the variable length data to optional positions or columns on the report. In addition, superfluous blanks are left on the report even when data are not allocated thereto.

In order to realize the above-mentioned allocation of variable length data or to suppress such superfluous blanks, a complicated program must be prepared for determining a layout of the report. A great deal of labor and expense are inevitably required to prepare such a complicated program. Therefore, the conventional print control system can not usually achieve an optimum layout on the report.

In an actual report necessary for business, variable length data must often be assigned to optional rows and columns specified on a report in optional forms. More specifically, a sequence of the variable length data may be folded within a print zone laid over a plurality of the rows.

Alternatively, successive individual variable length data sequences might continuously be printed out with no blanks interposed between the successive variable length data sequences. However, interposition of blanks is unavoidable in the conventional print control system. For exmaple, let a certain one of the variable length data sequences be assigned with a print zone of one hundred rows and have an amount of information enough for fifty rows. In this event, the remaining fifty rows are filled with blanks. The following variable data sequence should be printed after the blanks.

In the copending U.S. Pat. No. 4,812,999, application Ser. No. 020,330 filed Feb. 27, 1987, Sinji Ohara, assignor to NEC, proposes a data output control system which can specify column positions in addition to row positions. In this data output control system, each column position and each row position are successively renewed in response to instructions. However, no description is made concerning the print control operation which is carried out after renewal of the row and column positions.

SUMMARY OF THE INVENTION

It is an object of this invention to provide a print control system which makes a complicated program unnecessary to determine a layout for a variable length data sequence on a report.

It is another object of this invention to provide a print control system of the type described, which can save labor and expense and which is therefore inexpensive.

It is another object of this invention to provide a print control system of the type described, which can effectively suppress superfluous blanks which might otherwise be left on the report.

A print control system to which this invention is applicable is for use in printing a sequence of variable length data on a report having a print zone which includes a plurality of print areas. According to this invention, the print control system comprises: allocation signal producing means for producing allocation signals which indicate allocation of the sequence of variable length data to the plurality of print areas; allocation detecting means, responsive to the sequence of variable length data and to the allocation signals, for detecting whether or not the sequence of variable length data include blank data indicative of blanks to produce an allocation control signal when a blank is present, and, allocation determining means, responsive to the sequence of variable length data, to the allocation signals, and to the allocation control signal, for determining physical allocation of the sequence of variable length data to the print areas such that the physical allocation of the blank data is suppressed.

DESCRIPTION OF THE PREFERRED EMBODIMENTS

Figure 1:
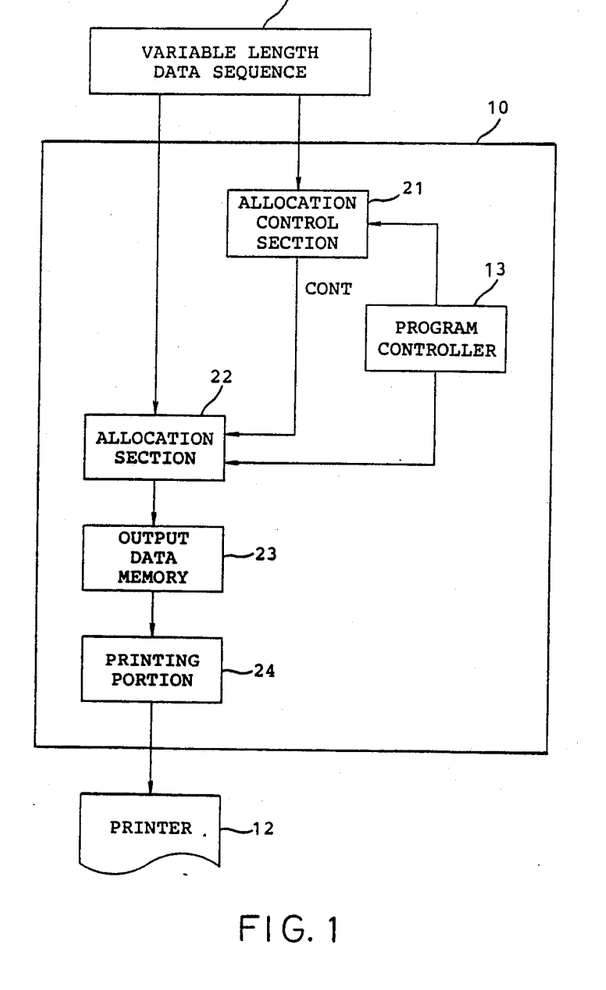
FIG. 1 shows a block diagram of a print control system according to a preferred embodiment of this invention together with a printer and a data memory.

Referring to FIG. 1, a print control system 10 according to a first embodiment of this invention is supplied with a sequence of variable length data stored in a data memory 11. The print control system 10 prints the variable length data sequence by a printer 12 on a recording medium to form a report.

The illustrated print control system 10 comprises a program controller 13 for processing a program which may be assumed to be expressed by a high-level language and which is translated by a compiler into a series of instructions and data signals. In other words, the compiler produces the instruction series and the data signals. The instruction series and the data signals are related to allocation of the variable lengthh data sequence to a plurality of partial print areas determined on a print zone and may collectively be referred to as allocation signals. In this connection, the program controller 13 may be called an allocation signal producing section.

Figure 2:
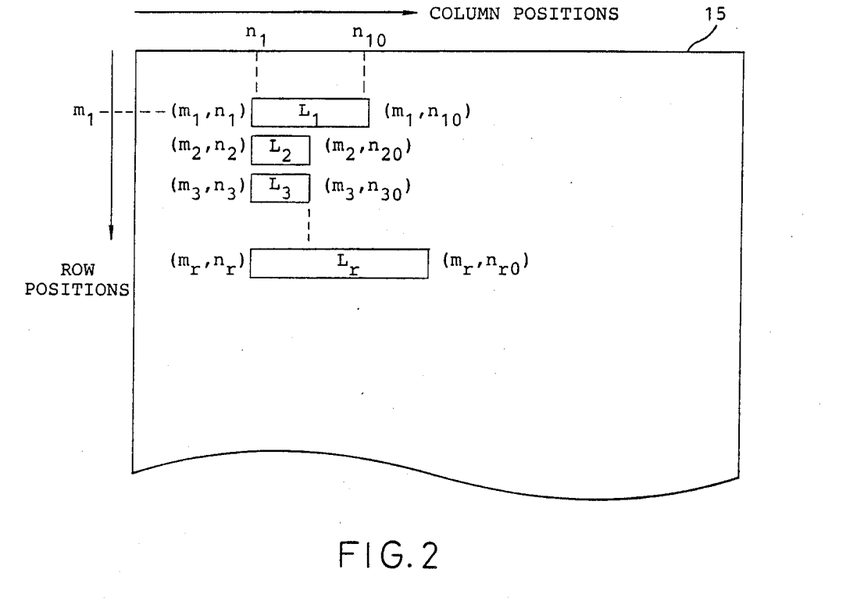
FIG. 2 exemplifies a print layout which has a plurality of partial areas.
Figure 3:
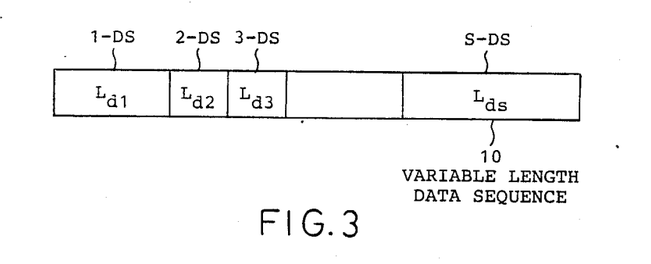
FIG. 3 shows a format of a variable length data sequence which is to be allocated to the partial areas illustrated in FIG. 2.

Temporarily referring to FIGS. 2 and 3, a print layout is exemplified in FIG. 2 to print a general sequence of variable length data on a report 15 having a print zone. The print zone is divisible into a plurality of partial print areas which can be specified by row and column positions and which are physically determined on the report. In the example being illustrated, it is assumed that first through r-th partial areas are physically assigned to the variable length data sequence in question in a manner illustrated in FIG. 2, regardless of a total data length $L_{dt}$ of the variable length data sequence. More particularly, the first through r-th partial areas have first through r-th area lengths $L_1$ to $L_r$. The first through r-th partial areas are defined by first through r-th row beginning positions $m_l$ $m_r$, first through r-th column beginning positions $n_1$ to $n_r$, first through r-th row end positions, and first through r-th column end positions $n_{10}$ to $n_{r0}$, respectively.

The first through r-th column beginning positions $n_1$ to $n_r$ may be different from one another, although they are coincident with one another in FIG. 2. On the other hand, the first through r-th row end positions are coincident with the first through r-th row beginning positions $m_1$ to $m_r$, respectively, and may therefore be expressed by $m_1$ to $m_r$, as shown in FIG. 2.

It is assumed that a specific variable length data sequence is assigned to the first through r-th partial areas. In this event, a total area length $L_{at}$ of the first through r-th partial areas is not always equal to the total data length $L_{dt}$ of the specific variable length data sequence. In other words, the total area length $L_{at}$ may be shorter or longer than the total data length $L_{dt}$.

In FIG. 3, the specific variable length data sequence is divided into first through S-th data sections 1-DS to S-DS having first through S-th data lengths $L_{d1}$ to $L_{ds}$, respectively.

When the total data length $L_{dt}$ is shorter than the total area length $L_{at}$, the first through (S−1)-th data lengths $L_{d1}$ to $L_{d(S-1)}$ are equal to area lengths $L_{a1}$ to $L_{a(S-1)}$ of the first through (S−1)-th partial areas, respectively, while the S-th data length $L_{ds}$ is equal to or shorter than an area length $L_{aS}$ of the S-th partial area. The remaining area or areas become empty or blank. The variable length data sequence may or not include blank data indicative of blanks.

When the data length is equal to the total area length $L_{at}$, the first through S-th data section 1-DS to S-DS are exactly assigned to the first through r-th partial areas, respectively. In addition, when the data length is longer than the total area length, the first through r-th data section 1-DS to r-DS can be assigned to the first through r-th partial areas, respectively, but the (r+1)-th through S-th data sections (r+1)-DS to S-DS can not be allocated to any partial areas. No such allocation may be indicated by the compiler.

At any rate, it is possible to detect the total data length $L_{dt}$ of the variable length data sequence by monitoring occurrence of a blank or blanks in each of the partial areas.

Figure 4:
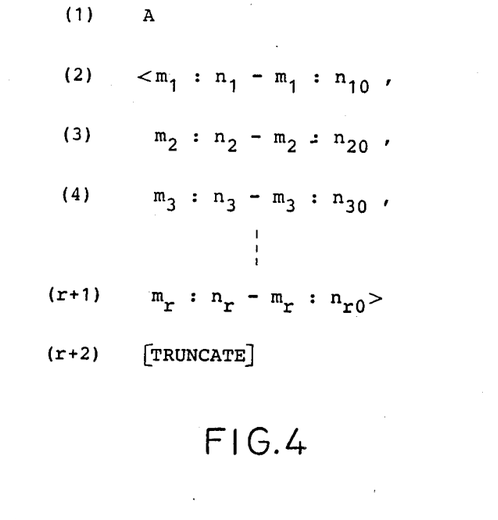
FIG. 4 shows a list for allocating the variable length data sequence to the partial areas illustrated in FIG. 2.

Referring to FIG. 4 together with FIG. 2, the print layout illustrated in FIG. 2 is expressed by a list shown in FIG. 4. The list is described by the use of a non-procedural language from the first line indicated at (1) to the (r+2)-th line indicated at (r+2). Along the first line (1) is disposed a name "A" given to a variable length data sequence allocated to a printing zone in question. The print layout for the variable length data sequence in question is defined between the second line and the (r+1)-th line and is enveloped by a pair of parentheses arranged along the second line (2) and the (r+1)-th line. As shown along the second through (r+1)-th lines, an i-th one of the first through r-th partial areas is at first specified by the row beginning position $m_i$ and the column beginning position $n_i$ with a colon (:) interposed therebetween. This shows that the position before each colon (:) is for indicating a row position while the position after each colon (:) is for indicating a column position. The i-th partial area is further specified by the row end position $m_i$ and the column end position $n_{i0}$ with a hyphen (—) interposed between the beginning positions $m_i : n_i$ and the end positions $m_i : n_{i0}$. From this fact, it is readily understood that positions before each hyphen are for indicating the beginning positions of each partial area while positions after the hyphen are for indicating the end positions thereof. Each partial area is therefore distinguished from one another by a comma disposed after the end positions. Thus, the second through (r+1)-th lines indicate positions of the partial print areas and produced by the program controller 13 as position signals which are a part of the allocation signals.

At the (r+2)-th line, the word "TRUNCATE" in brackets are arranged, to indicate no allocation of blanks to any partial print areas and the word may be called a parameter for no allocation of blanks to any partial print areas. In other words, the parameter indicates suppression of allocation. Therefore, arrangement of such a parameter on the list shows that no blanks are physically and actually allocated to any partial print areas when any blanks take place due to the fact that the total data length $L_{dt}$ is shorter than the total area length $L_{at}$. As a result, physical blanks are suppressed on a report when the parameter "TRUNCATE" is described on the list, although blanks are virtually detected on processing and may be referred to as virtual blanks. Such a parameter is produced by the program controller 13 as a suppression indication signal representative of suppression of the above-mentioned physical allocation.

Refrring back to FIG. 1, the illustrated control system 10 comprises an allocation control section 21 responsive to the variable length data sequence and controlled by the program controller 13 in a manner to be presently described. The allocation control section 21 is for controlling allocation of the variable length data sequence to the partial print areas of the print zone by detecting absence of any data, namely, a blank data section.

Figure 5:
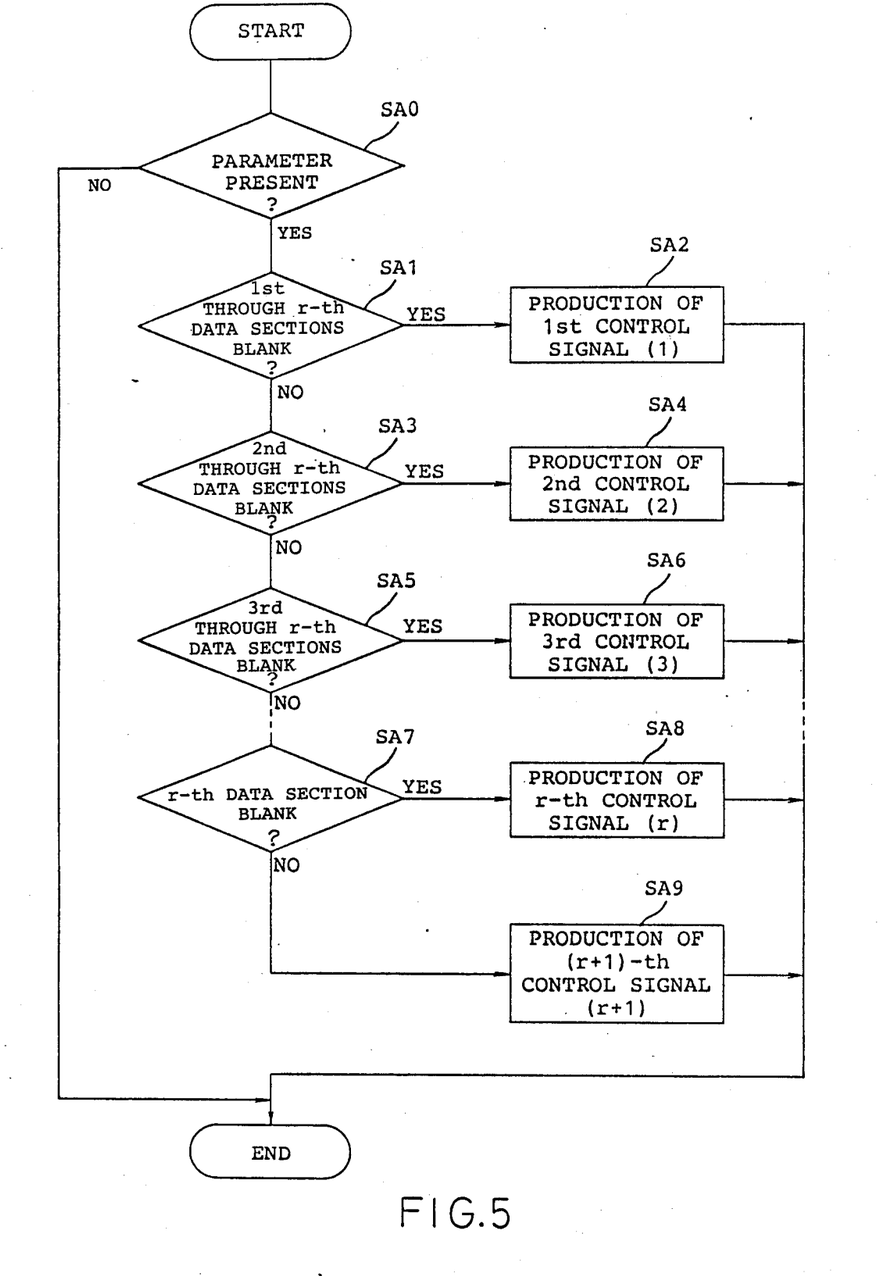
FIG. 5 shows a flow chart for use in describing operation of a portion illustrated in FIG. 1.

Referring to FIG. 5 in addition to FIG. 1, the allocation control section 21 is coupled to the program controller 13 to be supplied with the allocation signals produced by the compiler. More specifically, the allocation control section 21 is kept inactive when the total area length $L_{at}$ is shorter than the total data length $L_{dt}$ of the variable length data sequence in question and when the parameter expressed by "TRUNCATE" is not present. During an inactive state, no control signal is produced from the allocation control section 21. In other words, the allocation control section 21 becomes active to produce an allocation control signal in a manner to be described later when the parameter expressed by "TRUNCATE" is present on the list.

In FIG. 5, operation will be described on the assumption that thhe above-mentioned parameter is detected in the form of the suppression indication signal at a zeroth step $SA_0$ by the allocation control section 21. In other words, the zeroth step $SA_0$ serves to detect the suppression indication signal. The allocation control section 21 carries out detection or investigation of a position of blank data included in the variable length data sequence. For this purpose, the variable length data sequence is successively divided into the partial data sections DS in relation to the partial areas as shown in FIG. 2. As a result, the partial data section DS are successively and virtually allocated to the corresponding partial print areas which may be a part of the first through r-th partial print areas.

Under the circumstances, the allocation control section 21 investigates at a first step $SA_1$ whether or not all of the first through r-th partial data sections indicate blank or empty. When all of the partial data sections indicate empty, the allocation control section 21 produces a first one of the allocation control signals so as to indicate a value "1," as shown at a second step $SA_2$.

If the first through r-th data sections indicate not empty, the first step $SA_1$ is followed by a third step $SA_3$ for investigating whether or not the second through r-th partial data sections indicate empty. If the second through r-th partial data sections indicate empty, the third step $SA_3$ is succeeded by a fourth step $SA_4$ at which a second one of the allocation control signals is produced to indicate a value "2".

Otherwise, a fifth step $SA_5$ follows the third step $SA_3$ to investigate whether or not all of the third through r-th partial data sections indicate empty. If all of the third through r-th partial data sections indicate empty, a third one of the allocation control signals is produced to indicate a value "3," as shown at a sixth step $SA_6$.

Similar operation is successively repeated until the r-th partial data section alone is investigated as shown at a seventh step $SA_7$ as long as no blank data is detected. The seventh step $SA_7$ is followed by an eighth step $SA_8$ for producing an r-th one of the allocation control signals to indicate a value "r," when the r-th partial data section indicates blank. Otherwise, a ninth step $SA_9$ succeeds the seventh step $SA_7$ to produce an (r+1)-th one of the allocation control signals to indicate a value "r+1."

In general, the allocation control section 21 detects whether or not investigation of partial data sections from an i-th partial data section ($i \leq r$) to the r-th partial data section indicate entirely blank or empty. If the investigated partial data sections indicate entirely empty, the allocation control section 21 produces as the selected control signal CONT the value "1" which specifies the leading partial one of the investigated data sections. If no blank is detected in the investigated partial data sections, the next investigated partial data sections are determined by removing the former leading partial data section. Similar investigation is repeated until the r-th partial data section is investigated.

Thus, the value of the selected control signal CONT is indicative of a leading one of the partial data sections that indicate blank. At any rate, the first through ninth steps $SA_1$ to $SA_9$ serve to investigate the blank partial data sections to produce the allocation control signal.

At any rate, operation of the allocation control section 21 is completed by producing a selected one of the first through (r+1)-th control signals that is depicted as CONT in FIG. 1.

In FIG. 1, the selected control signal CONT is supplied to an allocation section 22 together with the variable length data sequence. The allocation section 22 is also supplied with the allocation signals with the instructions and the data signals under control of the compiler.

Figure 6:
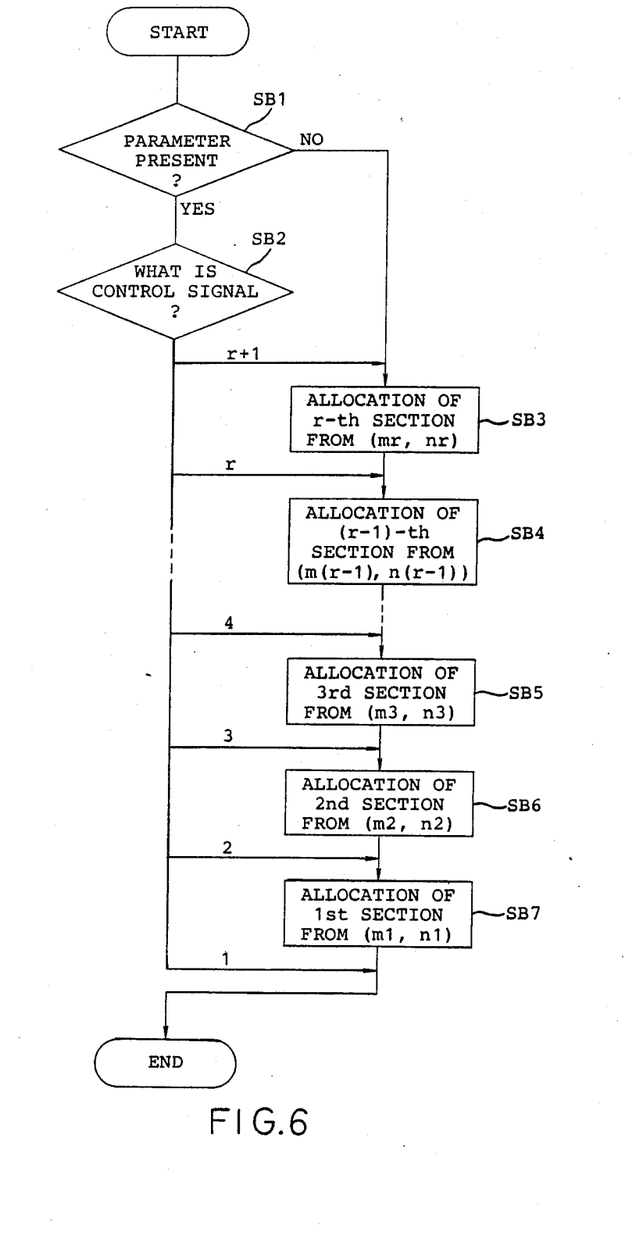
FIG. 6 shows a flow chart for use in describing operation of another portion illustrated in FIG. 1.

Referring to FIG. 6 together with FIG. 1, the allocation section 22 is operated to determine physical allocation of the variable length data sequence in a manner illustrated in FIG. 6. When operation is started, the allocation section 22 monitors the parameter at a first stage $SB_1$ to decide whether or not the parameter is presnet in the list. If the parameter is absent from the list, any physical blanks are not suppressed even on detection of virtual blanks. Therefore, the virtual blanks are actually allocated to the corresponding partial areas on the layout as shown in FIG. 2. Thus, the physical blanks are left on the layout without suppression and may be superfluous.

At any rate, the first stage $SB_1$ may serve to detect the parameter given as the suppression indication signal to put the allocation section 22 into an active state.

If the parameter is present in the list, the first stage $SB_1$ is followed by a second stage $SB_2$ for detecting what the selected control signal CONT indicates. In other words, the value of the selected control signal CONT is discriminated at the second stage $SB_2$ to determine a following stage. It is seen that the following stage is determined in dependency upon the value of the selected control signal CONT.

The second stage $SB_2$ is carried out to detect the blank partial data section and to produce as a blank data signal each value specified by the selected control signal CONT.

More particularly, when the value of the selected control signal CONT indicates the value (r+1), a third stage $SB_3$ succeeds the second stage $SB_2$ as the following stage to allocate the r-th partial data section of the variable length data sequence to the r-th partial print area. For this purpose, the r-th partial data section is allocated from the beginning position $(m_r, n_r)$ of the r-th partial area. Thereafter, fourth through seventh stages $SB_4$ to $SB_7$ are successively executed in a manner to be described.

When the value of the selected control signal CONT is equal to r, 4, 3, and 2, the second stage $SB_2$ is selectively followed by the fourth, the fifth, the sixth, and the seventh stages $SB_4$, $SB_5$, $SB_6$, $SB_7$, respectively. At the fourth stage $SB_4$, the (r−1)-th partial data section is allocated from the beginning position $(m(r-1), n(r-1))$ of the (r−1)-th partial area. Likewise, the third, the second, and the first partial sections of the variable length data sequence are allocated from the beginning positions $(m_3, n_3)$, $(m_2, n_2)$, and $(m_1, n_1)$ of the third, the second, and the first partial areas when the selected control signal CONT indicates the values "4," "3," and "2," respectively.

Furthermore, when the selected control signal indicates the value "1," all the first through r-th partial data sections indicate blank. Therefore, no allocation is carried out when the allocation section 22 detects the value "1" of the selected control signal CONT.

From the above, it is to be understood that the physical allocation to the blank or blanks is suppressed in dependency upon the value of the selected control signal CONT when the parameter is included in the list. At any rate, the third through seventh stages $SB_3$ to $SB_7$ are operable to suppress the physical allocation of the blank partial data sections.

In FIG. 1, the first through S-th partial data sections 1-DS to S-DS (FIG. 3) are mapped on an output data memory 23 by the allocation section 22 in the above-mentioned manner and are thereafter sent through a printing portion 24 to a printer 12.

Figure 7A:
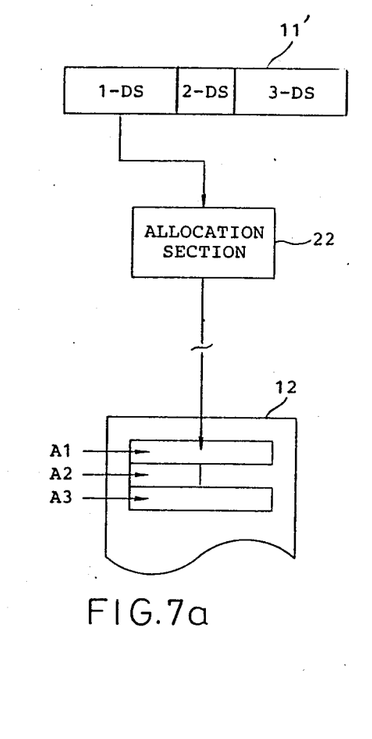
FIGS. 7(a) through 7(c) show block diagrams for use in describing schematic and specific operation of the print control system illustrated in FIG. 1.
Figure 7B:
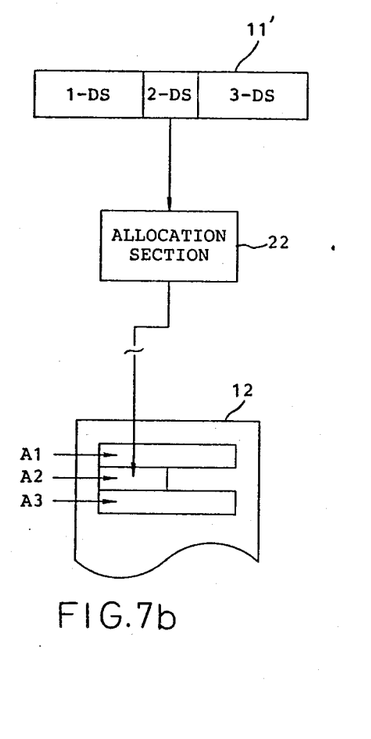
Figure 7C:
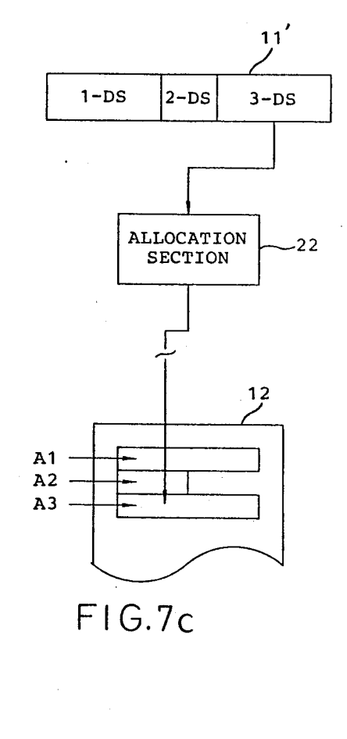

Referring to FIGS. 7(a) to 7(c), it is assumed that a variable length data sequence depicted as 11' has a total data length allocated to first through third partial areas depicted as $A_1$, $A_2$, and $A_3$ by the printer 12, respectively. In this event, the variable length data sequence is divided into first through third partial data sections 1-DS, 2-DS, and 3-DS of the variable length data sequence. At first, the first partial data section 1-DS is allocated to the first partial area $A_1$ under control of the allocation section 22, as illustrated in FIG. 7(a).

Subsequently, the second partial data section 2-DS is allocated to the second partial area, $A_2$, as illustrated in FIG. 7(b). Likewise, the third partial data section 3-DS is allocated to the third partial area $A_3$, as shown in FIG. 7(c).

Figure 8:
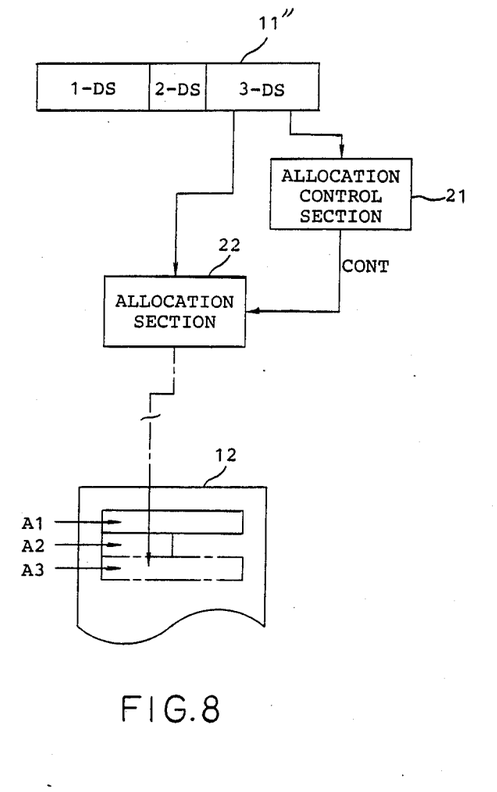
FIG. 8 shows a block diagram for use in describing another operation of the print control system illustrated in FIG. 1.

Referring to FIG. 8, it is assumed that the third partial data section 3-DS indicates blanks. In this case, the first and the second partial data sections 1-DS and 2-DS are allocated to the first and the second partial areas $A_1$ and $A_2$ in the manner described in FIGS. 7(a) and 7(b).

The allocation control section 21 detects a blank state of the third partial data section 3-DS to produce the selected control signal of the value "3." Responsive to the selected control signal CONT, the allocation section 22 does not allocate the third partial data section 3-DS to the third partial area $A_3$ in the above-mentioned manner. Therefore, the third partial area $A_3$ can be allotted to another variable length data sequence. This shows that the report is very effectively formed without superfluous physical blanks because such superfluous blanks are suppressed by monitoring a difference between the physical blanks and the virtual blanks detected by processing.

Moreover, it is readily possible to obtain an optional print layout by dividing a variable length data sequence into a plurality of partial data sections and by describing such an optional print layout in a nonprocedural language. Accordingly, this enables an unskilled person to form a complex report.

What is claimed is:

1. A print control system for use in printing a sequence of variable length data on a report having a print zone which includes a plurality of print areas, said system comprising:
    allocation signal producing means for producing allocation signals which indicate allocation of said sequence of variable length data to said plurality of print areas;
    allocation detecting means, responsive to said sequence of variable length data and to said allocation signals, for detecting whether or not said sequence of variable length data includes blank data indicative of a blank to produce an allocation control signal when said blank data is present; and
    allocation determining means, responsive to said sequence of variable length data, to said allocation signals, and to said allocation control signal, for determining physical allocation of said sequence of variable length data to said print areas with physical allocation of said blank data being suppressed and non-blank data being printed in sequence.

2. A print control system as claimed in claim 1, wherein said allocation signals comprise position signals specifying positions of said print areas on said report and a suppression indication signal indicative of suppression of physical allocation of said blank data.

3. A print control system as claimed in claim 2, wherein said positions and said suppression are described in a nonprocedural language.

4. A print control system as claimed in claim 2, wherein
    said allocation detecting means comprises:
    suppression detecting means, responsive to said allocation signals, for detecting said suppression indication signal from said allocation signals to put said allocation detecting means into an active state on detection of said suppression indication signal.

5. A print control system as claimed in claim 4, wherein said allocation detecting means further comprises:
    investigating means, coupled to said suppression detecting means and responsive to said position signals, for investigating said blank data using said position signals to produce said allocation control signal related to said blank data on detection of said suppression indication signal in said suppression detecting means.

6. A print control system as claimed in claim 2, wherein said allocation determining means comprises:
    suppression indication signal detecting means for detecting said suppression indication signal to cause said allocation determining means to suppress physical allocation of said blank data.

7. A print control system as claimed in claim 6, wherein said allocation determining means further comprises:
    blank data detecting means, coupled to said suppression indication signal detecting means and to said allocation detecting means, for detecting said blank data in response to said allocation control signal to produce a blank data signal indicative of said blank data; and
    means, coupled to said blank data detecting means, for suppressing physical allocation of said blank data in response to said blank data signal by interrupting physical allocation associated with said blank data indicated by said blank data signal.

8. A print control system for use in printing a sequence of variable length data on a report having a print zone which includes a plurality of print areas, said sequence of variable length data being divisible into a plurality of partial data sections to be assigned to said print areas, wherein said print control system comprises:
    allocation signal producing means for producing allocation signals which indicate allocation of said sequence of variable length data to said print areas;
    dividing means, coupled to said allocation signal producing means, for dividing said sequence of variable length data into said plurality of partial data section in response to said allocation signals; and
    allocating means, coupled to said dividing means and to said allocation signal producing means, for successively allocating said plurality of partial data sections to said print areas in response to said allocation signals such that non-blank data is printed in sequence.

* * * * *